US010853356B1

(12) United States Patent
McPherson et al.

(10) Patent No.: US 10,853,356 B1
(45) Date of Patent: Dec. 1, 2020

(54) PERSISTENT METADATA CATALOG

(71) Applicant: Amazon Technologies, Inc., Reno, NV (US)

(72) Inventors: George Steven McPherson, Seattle, WA (US); Yevgeniy Mikhaylyuta, Sammamish, WA (US); Tobin Daniel Baker, Everett, WA (US); Richard Jeffrey Cole, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 793 days.

(21) Appl. No.: 14/310,422

(22) Filed: Jun. 20, 2014

(51) Int. Cl.
*G06F 16/24* (2019.01)
*G06F 21/62* (2013.01)

(52) U.S. Cl.
CPC .......... *G06F 16/24* (2019.01); *G06F 21/6218* (2013.01)

(58) Field of Classification Search
None
See application file for complete search history.

(56) References Cited

U.S. PATENT DOCUMENTS

| | | | | |
|---|---|---|---|---|
| 6,421,675 | B1 * | 7/2002 | Ryan | G06F 17/3061 |
| 6,611,838 | B1 | 8/2003 | Ignat et al. | |
| 7,668,873 | B2 * | 2/2010 | Davis | G06F 17/2205 |
| | | | | 707/802 |
| 8,412,709 | B1 * | 4/2013 | Belwadi | G06Q 10/06 |
| | | | | 707/736 |
| 8,442,994 | B1 * | 5/2013 | Chen | G06F 17/30864 |
| | | | | 707/711 |
| 10,540,330 | B1 * | 1/2020 | Tiwari | G06F 16/10 |
| 2004/0133609 | A1 * | 7/2004 | Moore | G06F 16/256 |
| 2006/0085406 | A1 * | 4/2006 | Evans | G06F 17/30569 |

(Continued)

FOREIGN PATENT DOCUMENTS

| | | |
|---|---|---|
| WO | 0042553 | 1/2000 |
| WO | 2006010107 | 1/2006 |

OTHER PUBLICATIONS

ESRI, Implementing a Metadata Catalog Portal in a GIS Network, Mar. 2003 (Year: 2003).*

(Continued)

*Primary Examiner* — Usmaan Saeed
*Assistant Examiner* — Yu Zhao
(74) *Attorney, Agent, or Firm* — Robert C. Kowert; Kowert, Hood, Munyon, Rankin & Goetzel, P.C.

(57) ABSTRACT

A metadata catalog may store metadata about data sources. The metadata may define table, column, partition and/or data formats, as well as title information, textual descriptions, modification information, data schemas and access information, such as location and connection information. A metadata catalog service may provide a shared, persistent, central repository for the metadata. The metadata of the catalog may be published via multiple access mechanisms and programmatically obtained and processed by other programs via the metadata catalog service. Metadata consumers may utilize the metadata catalog service to perform various metadata tasks, such as metadata retrieval, creation, addition, modification and/or deletion. The metadata catalog service may be directly integrated into existing data analytic tools as a persistent and durable metadata store allowing users to utilize the broad set of data processing tools.

20 Claims, 10 Drawing Sheets

(56) References Cited

U.S. PATENT DOCUMENTS

| | | | |
|---|---|---|---|
| 2006/0265385 A1* | 11/2006 | Agrawal | G06F 16/256 |
| 2007/0050409 A1* | 3/2007 | Bugir | G06F 17/30038 |
| 2007/0185921 A1 | 8/2007 | Prahlad et al. | |
| 2007/0192352 A1 | 8/2007 | Levy | |
| 2010/0161629 A1* | 6/2010 | Palanisamy | G06F 17/30893 |
| | | | 707/756 |
| 2010/0161657 A1 | 6/2010 | Cha et al. | |
| 2010/0250867 A1* | 9/2010 | Bettger | G06F 3/067 |
| | | | 711/152 |
| 2011/0004880 A1 | 1/2011 | Schumacher et al. | |
| 2011/0138478 A1 | 6/2011 | Kaarela et al. | |
| 2011/0302583 A1 | 12/2011 | Abadi et al. | |
| 2011/0307493 A1* | 12/2011 | Noor | G06F 17/30292 |
| | | | 707/746 |
| 2012/0143923 A1* | 6/2012 | Whitney | G06F 17/30997 |
| | | | 707/803 |
| 2013/0254897 A1* | 9/2013 | Reedy | G06F 21/10 |
| | | | 726/26 |
| 2013/0298111 A1 | 11/2013 | Koseki et al. | |
| 2014/0068544 A1* | 3/2014 | Fanning | G06F 17/30964 |
| | | | 717/100 |

OTHER PUBLICATIONS

Singh et al., A Metadata Catalog Service for Data Intensive Applications, Nov. 2003 (Year: 2003).*

A Semantic Metadata Catalog Service for Grid:, Kewei Wei, et al., 2005, pp. 136-142.

"Metadata Catalogs with Semantic Representations", Yolanda Gil, et al., International Provenance and Annotation Workshop, May 3-5, 2006, pp. 1-10.

"Hive—A Warehousing Solution Over a Map-Reduce Framework", Ashish Thusoo, et al., Aug. 2009, pp. 1-4.

"A Metadata Catalog Service for Data Intensive Applications", Gurmeet Singh, et al., 2003, pp. 1-17.

* cited by examiner

PERSISTENT METADATA CATALOG

BACKGROUND

Discovering and accessing data in a networked computer environment is traditionally a common part of research, development and business efforts. Companies, universities and other entities frequently generate and publish data, providing that to others, such as via the Internet or other networks. Both private and public databases have become commonplace. However, private data centers are frequently operated by, and on behalf of, a single organization and public data centers are frequently operated by independent businesses to provide computing resources only to their customers.

Frequently a data consumer (e.g., someone using the data) may use data from many different sources. Many modern projects require data from third party data sources. Traditionally, each data publisher must also provide information describing the location, format, structure, and accessibility of the data. Data consumers had to discover both the data and the format of that data independently. Additionally, a data consumer might have to discover different data sources (and their respective data definitions) in different ways. For instance, each data publisher may publish their data and data definitions in different locations and in different manners. In general it may be difficult for a programmer, developer, data analyst, or other researcher to discover and gain access to third party data.

Figure 1:
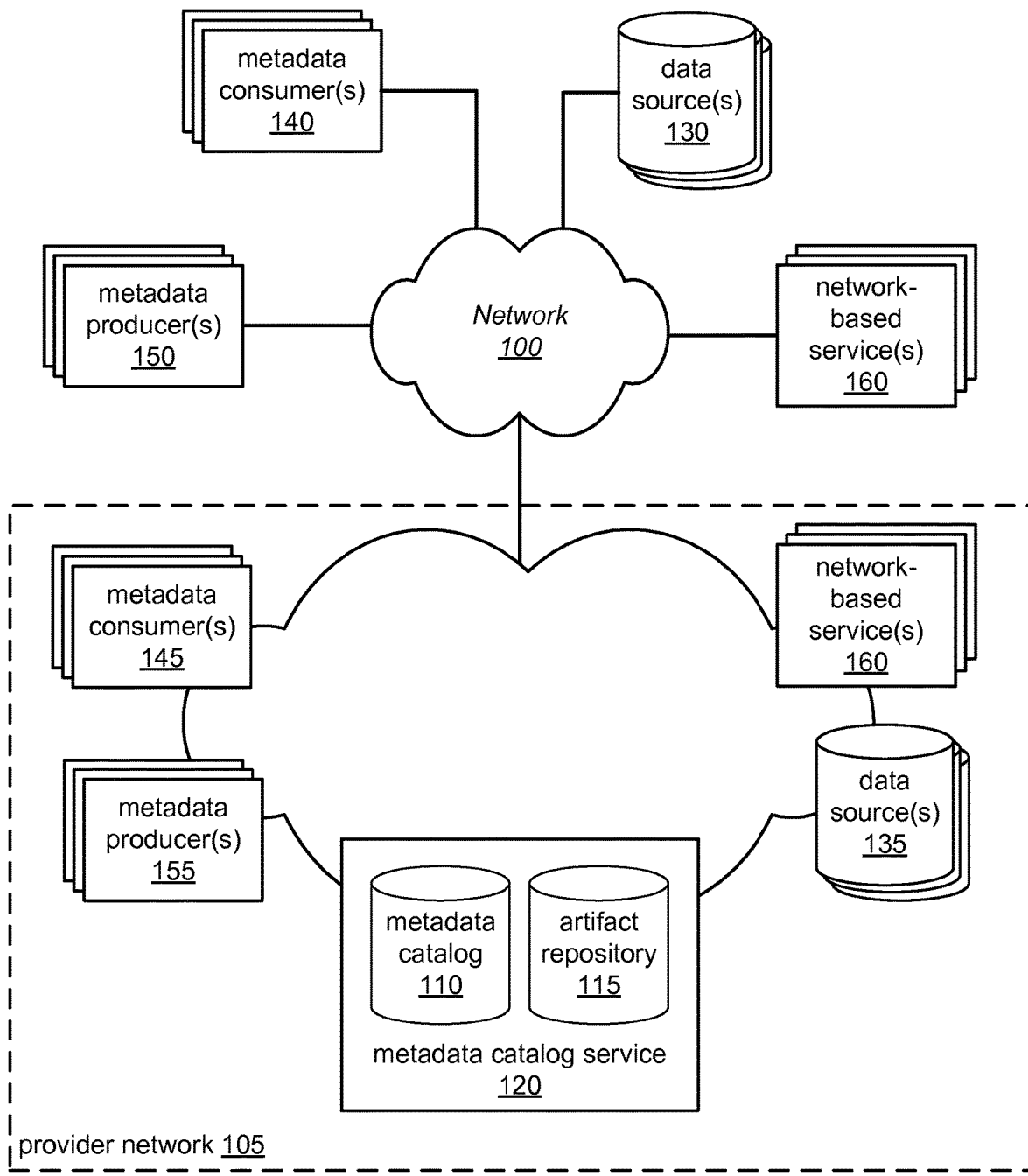
FIG. 1 is block diagram illustrating an example system environment for implementing a Metadata Catalog Service, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for implementing a metadata catalog and metadata catalog service are described. A metadata catalog may be a data store configured to store metadata regarding one or more data sources. According to some embodiments, a metadata catalog may be considered a catalog of metadata for one or more data sources. The metadata of the metadata catalog may define the schema and access information of the data sources. A metadata catalog may be considered a metastore (or metadata store) of table, column, partition and/or data source definitions, according to one embodiment. In other words, a metadata catalog service may provide a central point of integration for analytics and extract, transform, load (ETL) tools. It may also allow the creation of a heterogeneous query engine outside of primary data sources and may optimize (or improve) query performance by caching data and relying on the catalog service to know if the primary source as been changed or updated.

According to some embodiments, a metadata catalog service may provide a persistent metastore (e.g., metadata storage) for data descriptions that can be programmatically interacted with from virtually any software agent, such as via a network-based interface, to describe the location and format of data so that other programs can obtain and process those definitions. In other embodiments, a metadata catalog service may be a shared repository that may be considered agnostic of data sources and that may be used as a central repository by various users and/or metadata producer/consumer applications for a diversity or purposes. In other embodiments, a metadata catalog service may be a centralized service, independent of client domains, that may be used as a mechanism for publishing data definitions and access information across multiple entry points (e.g., access mechanisms) that may include the expression of both permissions and/or federations. The metadata managed by a metadata catalog service may include, among other things, title information, textual descriptions, modification data and/or connection information for a dataset or data source, according to some embodiments. Additionally, a metadata catalog service may provide detailed schema information, such as table, column and/or partition definitions that may describe data from virtually any traditional tabular data set. Additionally, a metadata catalog service may enable multiple, different, query processors (e.g., that may query data in different manners) to access the same description of data and/or metadata.

In some embodiments, a metadata catalog service may be considered to provide information regarding relationships between data, data sources, and applications that utilize data. For example, an application may be able to utilize a metadata catalog service to retrieve metadata information that enables the application to locate, obtain, and/or manipulate data, possibly using one or more other applications in the process. Thus, in some embodiments, a metadata catalog service may not be considered as data source centric, as relationship centric.

FIG. 1 is block diagram illustrating an example system environment for implementing a metadata catalog service, according to one embodiment. As shown in FIG. 1, metadata catalog 110 may store metadata for a number of data sources, such as data sources 130 and 135. According to various embodiments, data sources 130 and 135 may represent any of various data sources.

In some embodiments, metadata catalog service 120 may be configured to provide access to a metadata store, such as metadata catalog 110, to various metadata producers and metadata consumers, such as metadata data consumers 140 and 145, as well as metadata producers 150 and 155, across any of various communications networks, such as network 100. In addition, FIG. 1 illustrates artifact repository 115 that may store binary artifacts for accessing data according to metadata stored in metadata catalog 110.

In addition to allowing metadata producers and consumers to retrieve metadata stored in a metadata catalog, metadata catalog service 120 may also allow producers and/or consumers to add, delete or modify metadata stored in a metadata catalog, according to some embodiments. For example, metadata catalog service 120 may be configured to host metadata regarding a collection of data sources and may allow users/clients/producers/consumers to add/access new metadata regarding additional data sources.

In one embodiment metadata catalog service 120 may host metadata for a collection of data sets that are available in the public domain, such as the 1000 genome, NASA NEX, and the Common Crawl Corpus data sets. Any data producer may be able to add information regarding their data to these collections, as an example.

The collection service hosting the actual data sources may not enforce data format standards and may not provide an API for listing or discovering the datasets. The collection service may not provide an API to listing or discovering schema for the datasets. Thus, metadata catalog 110 and metadata catalog service 120 may be utilized to provide information regarding what data sources are included in data collections, as well as metadata information regarding the individual data sources, such as schema and data format information, according to one embodiment. In other words, as well as providing metadata regarding data formats and location, metadata catalog service 120 may provide a discovery and listing service for data sources in various collections (e.g., for data stored externally to the metadata catalog service).

Rather than requiring a user (and/or metadata consumer application) to investigate each data source from the collection individually to discover its format and access interface, a metadata consumer may utilize a standard interface provided by metadata catalog service 120 to discover not only the data sources in the collection, but the data format (e.g., data schema) and access interface for individual data sources. This may be true even when different data sources must be accessed in different manners, such as with MySQL, Postgres, Microsoft SQL server, or using different data formats, such as CSV, Excel or NetCDF, according to some embodiments.

While FIG. 1 illustrates metadata catalog 110 and artifact repository 115 within metadata catalog service 120, in some embodiments, metadata catalog 110 and/or artifact repository 115 may reside outside of (e.g., on one or more separate devices) metadata catalog service 120 In other embodiments, metadata catalog 110 may reside on one or more computers while metadata catalog service 120 may reside on yet another computer. In one embodiment, metadata catalog service 120 may reside on a computer configured as a node in a multi-node system configured to provide metadata catalog services via a network, such as the internet, while metadata catalog 110 and/or artifact repository 115 may reside on other nodes or devices within the multi-node system. In general, metadata catalog 110 and/or artifact repository 115 may be considered to logically be part of metadata catalog service 120 whether or not they are physically stored on the same device as other portions of metadata catalog service 120.

In the example embodiments illustrated in FIG. 1, provider network 105 may include various systems/devices, such as metadata consumer(s) 145, metadata producer(s) 155, data source(s) 135, metadata catalog service 120, as well as various other network-based services, such as network-based service(s) 160. According to various embodiments, provider network 105 may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients/customers in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

In one embodiment, operators of provider networks may implement a flexible set of resource reservation, control, and access interfaces for their customers. For example, a provider network may implement a programmatic resource reservation interface (e.g., via a web site or a set of web pages) that allows customers to learn about, select, purchase access to, and/or reserve resource instances. For example, metadata consumer(s) 145, metadata producer(s) 155, data source(s) 145 and network-based service(s) 160 may represent customer resource instances, in one embodiment.

As illustrated in FIG. 1, metadata catalog service 120 may provide a persistent metadata catalog accessible by producers and consumers that may be part of, and/or external to, provider network 105. The metadata maintained by metadata catalog service 120 may describe data within data sources, such as data source(s) 140 and data source(s) 135, that may be both part of, and/or external to, provider network 105, according to some embodiments. In other words, metadata catalog service 120 may provide metadata services (e.g., the ability to add, remove, modify and/or access metadata information) to metadata producers and consumers that are not part of the same provider network as metadata catalog service 120 rather than only providing metadata services to metadata producers and consumers that are part of the same provider network as metadata catalog service 120.

In some embodiments, metadata catalog 110 and/or metadata catalog service 120 may provide a persistent catalog of metadata (i.e., data about data) for the data sources 130 and/or 135. For example, metadata catalog service 120 may be configured to provide clients and/or customers, a programmatically accessible list of data sets from various data sources and related metadata about the data sets. For instance, the provided information may include attributes, such as the title of the data set, a textual description of the data set, a last modified date of the data set, and/or connection information for accessing the data set. The service can also provide detailed schema information such as table, column, and partition definitions. This schema information can describe data from any traditional tabular data set.

In some embodiments, a metadata catalog and/or a metadata catalog service, such as metadata catalog 110 and/or metadata catalog service 120, may be considered the foundation of an analytics engine or service that may be separate from, and external to, the metadata catalog. Metadata catalog service 120 may be configured to provide programmatic access to metadata catalog 110 and/or artifact repository 115 via one or more network-based interfaces. The metadata catalog service 120 may allow different data analysis tools, such as extract, transform, load (ETL) tools to share a common definition of schema information for data sources. Additionally, metadata catalog service 120 may be utilized by different data consumer and analytic applications as an authoritative source of schema information. In some embodiments, metadata catalog service 120 may be considered, such as from a consumer perspective, a web-based service for data management.

It is contemplated that the system illustrated in FIG. 1 may include additional, fewer or additional devices and/or modules than those shown. For instance, although only a single metadata catalog 110 is illustrated for purposes of example, it is contemplated that any suitable number of metadata catalogs may be used in conjunction with metadata catalog service 120. Similarly, although only a metadata catalog service 120 is illustrated for purposes of example, it is contemplated that any suitable number of metadata catalog service nodes may be used in conjunction with metadata catalog 110. In some embodiments, metadata catalog service 120 and/or metadata catalog 110 may be implemented as virtual compute instances or as physical compute instances. One or more virtual compute instances may be implemented by the example computing device 3000 illustrated in FIG. 11. In various embodiments, the functionality of the different components of the system illustrated in FIG. 1 may be provided by the same computing device or by different computing devices. If any of the various components are implemented using different computing devices, then the respective computing devices may be communicatively coupled, e.g., via one or more networks, such as network 100. Additionally, each component may represent any combination of software and hardware usable to perform their respective functions, as discussed as follows.

In one embodiment, metadata catalog service 120 may manage one or more metadata catalogs to provide metadata services accessible via the Internet and/or other networks to a set of data consumers. A metadata catalog service may include numerous metadata catalogs hosting metadata for various data sources. A number of different types of computing devices may be used singly or in combination to implement the metadata catalogs and/or the metadata catalog service, including general purpose or special purpose computer servers, storage devices, network devices, and the like.

In one embodiment, a metadata catalog service may implement a flexible set of access interfaces for data consumers. For example, a metadata catalog service may implement a programmatic interface (e.g., via a web site or a set of web pages) that allows data consumers to learn about, select and/or access metadata information regarding data sources. Additionally, metadata catalog service may provide a uniform interface to query and process metadata which in turn allows querying and processing of data in various data sources. Metadata catalog service 120 may also provide a standard (e.g., uniform) view of metadata for a data source. Thus, metadata catalog service 120 may be considered a persistent metadata store, such as metadata catalog 110, allowing users (and/or consumer applications) to discover, list and update metadata on data stored in virtually any network enabled data store. Metadata catalog service 120 may allow producer and/or consumer applications to utilize a network-based interface to discover metadata (such as data location, storage protocol, and schema) on public data sets which otherwise might have to be discovered by hand.

In one embodiment, a metadata consumer may use one or more suitable interfaces (such as one or more web pages, web or network interfaces, an application programming interface [API], or a command-line interface [CLI]) to specify metadata tasks to be implemented, such as metadata retrieval, addition, modification and/or deletion. Moreover, a metadata catalog service may be configured to be accessible via a network-based interface via requests initiated by a human (e.g., a user of a metadata consuming or metadata producing application) or initiated by a computer agent (e.g., an automated computer program/application configured to access the metadata catalog service).

For example, in some embodiment, a metadata catalog service 120 may include (and/or expose) an API that includes such methods as CreateDatabase, DropDatabase, AlterDatabase, GetDatabase, GetDatabases, CreateTable, DropTable, AlterTable, GetTable, GetTables, GetTableObjectsByName, AddPartition, DropPartition, AlterPartition, GetPartition, GetPartitions. Additionally, in some embodiments, the API utilized by metadata catalog service 120 may be a strongly typed API. However, the above noted methods are merely examples and different embodiments may include and/or utilize fewer, additional or different sets of API methods. For instance, in one embodiment, metadata catalog service 120 may be configured to include an API that is the same (or similar) to an API for an existing database system, so as to allow the metadata catalog service to be easily utilized by applications built to use the existing database system.

In some embodiments, metadata catalog service 120 may include built in support for various data consumer applications. Providing built in support for particular data applications may remove the need for metadata catalog consumers and/or customers to host and manage independent metadata store infrastructures. In some embodiments, data consumers and data applications may rely on metadata catalog service 120 to provide a persistent metadata store, such as metadata catalog 110. Thus, data consumer applications may be able to interact directly with the metadata catalog without including additional functionality within the data consumer application.

In some embodiments, metadata catalog service 120 may be directly integrated into existing data analytic tools as a persistent and durable metadata store (e.g., a persistent store of metadata, such as metadata catalog 110). This may allow users to utilize the broad set of data processing tools. Also, data consumer may utilize high-performance query engines to perform low-latency data analysis in an interactive user interface, according to some embodiments. Thus, metadata catalog service 120 may provide a fully interactive analytics environment for exploring and processing data in both public and private data sets.

According to some embodiments, users/consumers may be able browse and query data sets while using existing data processing tools to enrich their own data. For example, a user may be able to join web access logs from various data sets, such as to group usage based on ZIP code.

In some embodiments, metadata catalog service 120 may provide programmatic access, and/or web interface, to the location and schema of data available in various data sets, thereby possibly removing (or reducing) the complexity of discovering, accessing and/or transforming data from a native format. Metadata catalog service 120 may also allow users to directly query and join data from various data sets with their own data via a variety of existing SQL and/or scripting tools, by providing a uniform methodology for obtaining location, schema and/or connection information regarding the data in the data sets. Such integration may also facilitate the analysis of public data sets with low-latency interactive query engines, according to some embodiments.

In some embodiments, metadata catalog service 120 may provide a centralized repository of data definitions and related metadata allowing organizations to define data sets once and share them throughout their organization. Metadata catalog service may also allow administrators to designate access permissions (such as by defining users, groups and/or roles policies) for shared data set definitions, in some embodiments.

In some embodiments, the metadata stored in a metadata catalog may be encrypted and/or digitally signed. Additionally, metadata catalog service 120 may be configured to provide a secure (e.g., encrypted) interface for accessing the metadata. Thus, in some embodiments, any (or all) interfaces, such as a network-based interface for interacting with metadata catalog service 120 may be a secure interface (e.g., utilizing authentication and/or encryption).

In some embodiments, metadata catalog service 120 may also provide a mechanism to import metadata from existing metadata stores. Thus, in some embodiments, metadata catalog service 120 may provide a metadata migration tool allowing importing of metadata, such as into metadata catalog 110).

In some embodiments, metadata catalog service 120 may be directly integrated into ETL services that automate the movement and transformation of data. For example, a user may be able to define data-driven workflows within an existing data service that may interact with metadata catalog service 120 to determine where and how to access data (e.g., using the metadata from the metadata catalog). Additionally, metadata catalog service 120 may be configured, in some embodiments, to be accessed as work, task, or node definitions in existing services, thereby allowing reuse of previously-defined connection and schema information when defining workflows.

Additionally, metadata catalog service 120 may be configured to remove and/or reduce the complexity of operating an independent infrastructure supporting multiple data sources.

In some embodiments, this may allow data consumers to run parallel or ephemeral data clusters and to share schema definitions across clusters. The integration of metadata catalog service 120 with other data applications may provide access to a diverse set of data processing tools.

Metadata catalog service 120 may also include built in support for web-based identity and access management regarding the data sources for which metadata is stored in metadata catalog 110. Such built in support for identity and access management may allow data consumers to centrally control access to data resources whose metadata is stored within the metadata catalog 110. Thus in some embodiments, metadata catalog service 120 may be configured to verify whether a requesting metadata consumer has permission to access metadata (e.g., for a particular data source or dataset) before providing that metadata to the metadata consumer. Similarly, metadata catalog service 120 may be configured to verify whether a metadata producer has permission to add, modify or remove metadata regarding a particular data source prior to making changes to metadata in metadata catalog 110. In some embodiments, access permissions (whether to add, remove, modify or access) may be implemented on an individual data source basis, such that a metadata producer or consumer may have access permission regarding one data source but not another.

Metadata catalog service 120 may also be configured to function as an abstract data catalog service, such as described by the Data Catalog Vocabulary (DCAT) specification, by describing data sources in data catalogs. Thus, metadata catalog service 120 may be configured to provide discoverability for data publishers and enable applications to consume metadata from multiple catalogs. In some embodiments, metadata catalog service 120 may provide listings and description information for various data sources and metadata consumers may use metadata catalog service 120 as a source for programmatic access to data sources.

As noted above, metadata catalog service 120 may be configured to provide metadata services to various data consumers, such as data analysis applications. For example, a data consumer may read the metadata that is present in metadata catalog 110 and present it to users (or other applications) as reusable schema definitions.

Additionally, metadata catalog service 120 may provide a Java application programming interfaces (API) and/or Java database connectivity (JDBC) interfaces for consuming data that is described in the catalog. This may allow OEMs and/or other external developers to integrate the metadata catalog service into various analytics and extract, transform, load (ETL) tools. For example, analytics software packages may be able to read schema information from metadata catalog 110 and query resources directly instead of requiring users to discover or configure data sources on their own.

Figure 2:
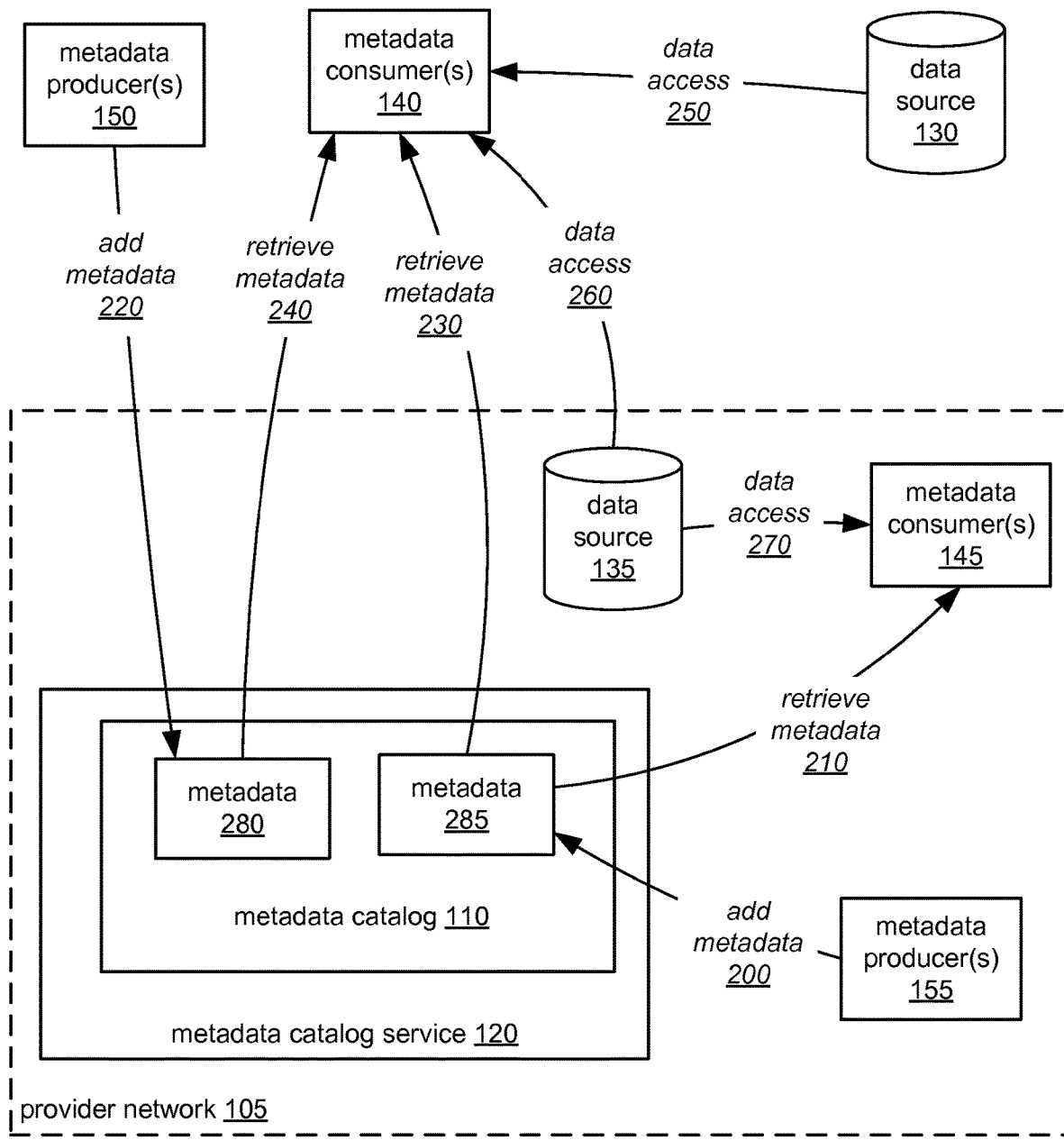
FIG. 2 is a logical block diagram illustrating multiple producers and consumers accessing a metadata catalog service, as in one embodiment.

FIG. 2 is a logical block diagram illustrating multiple producers and consumers accessing a metadata catalog service, as in one embodiment. As described above regarding FIG. 1, metadata catalog service 120 may provide access to metadata catalog 110, which may store metadata (e.g., data describing other data) regarding data stored on one or more data sources, such as data sources 130 and 135. For ease of explanation, metadata catalog 110 is shown within metadata catalog service 120, however metadata catalog 110 may be physically distinct, yet accessible to, devices implementing metadata catalog service 120, according to various embodiments.

As illustrated in FIG. 2, various metadata user applications, such as metadata producers 150 and 155, as well as metadata consumers 140 and 145, may be given access to metadata stored on metadata catalog 110 via metadata catalog service 120. In some embodiments, metadata catalog service 120 may be configured to allow metadata user applications, such as metadata producers 150 and 155, to create or add new metadata to metadata catalog 100 and make that metadata available to other metadata users, such as metadata consumers 140 and 145. For example, metadata producer 155 may add metadata 285, describing data in data source 135, to metadata catalog 110 via metadata catalog service 120, as illustrated via add metadata arrow 200. Subsequently, other metadata users, such as metadata consumers 140 and 145 may access and retrieve metadata 285, as represented by retrieve metadata arrows 210 and 230. Metadata consumers 140 and 145 may then access the data stored in data source 130, according to the information in metadata 280, as represented by data access arrows 260 and 270.

In one embodiment, metadata catalog service 120 may be configured to implement roles and/or permissions to allow metadata producers to restrict access to particular metadata within metadata catalog 100, as will be explained in more detail below. For example, metadata producer 150 may add metadata 280 regarding data source 130 to metadata catalog 100 via metadata catalog service 120, as illustrated by add metadata arrow 220. In this example embodiment, metadata producer 150 may define/configure roles and/or permissions regarding metadata 280 such that metadata consumer 140 may access metadata 280, while metadata consumer 145 may not. Thus, as illustrated by retrieve metadata arrow 240, metadata consumer(s) 140 may obtain metadata 280 from metadata catalog 110 via metadata catalog service 120. Metadata consumer(s) 140 may have to present any of various sorts of identity, authentication and/or permission information to metadata catalog service 120 in order to access metadata 280, according to various embodiments. Metadata catalog service 120 may validate any identity authentication and/or permission information provided by the metadata consumer in order to determine whether or not the consumer should be allows access to the metadata. Once a metadata consumer has obtained the metadata information, the consumer may then access data source 130 according to information in metadata 280, as shown by data access arrow 250.

While metadata catalog service 120 may be configured to apply roles and/or permissions to allowing access to metadata stored within metadata catalog 110, these roles and/or permissions may be separate from any access roles and/or permissions applied to the data sources themselves. While is some embodiments, the access roles and/or permissions implemented by metadata catalog service 120 may be the same as those applied to data sources, metadata catalog service 120 may not have anything to do with implementing those access roles and/or permissions at the data sources (e.g., when a data producer/consumer accesses a data source).

Metadata catalog service 120 may provide (and/or expose) a permission API that allows data consumers to set and/or modify the permissions and/or roles information regarding one or more datasets and/or data sources, according to some embodiments. However, in various embodiments, metadata may be added, removed and/or modified in different manners, such as via a web page, a command line interface, user interface console, an API and/or via network-based interface (any of which may be secure in nature).

While not illustrated in FIG. 2, metadata producers may also be metadata consumers. Thus, metadata producer 150 may both add new metadata to metadata catalog 110 and access other metadata maintained the metadata catalog. In general, anything described herein as being performed by a metadata producer may also be performed by a metadata consumer. Similarly, anything described herein as being performed by a metadata consumer may also be performed by a metadata producer. In other words, the terms producer and consumer, as applied to use in the context of interacting with a metadata catalog service is for ease of discussion and does not imply any limitations or restrictions those entities, devices or applications.

Figure 3:
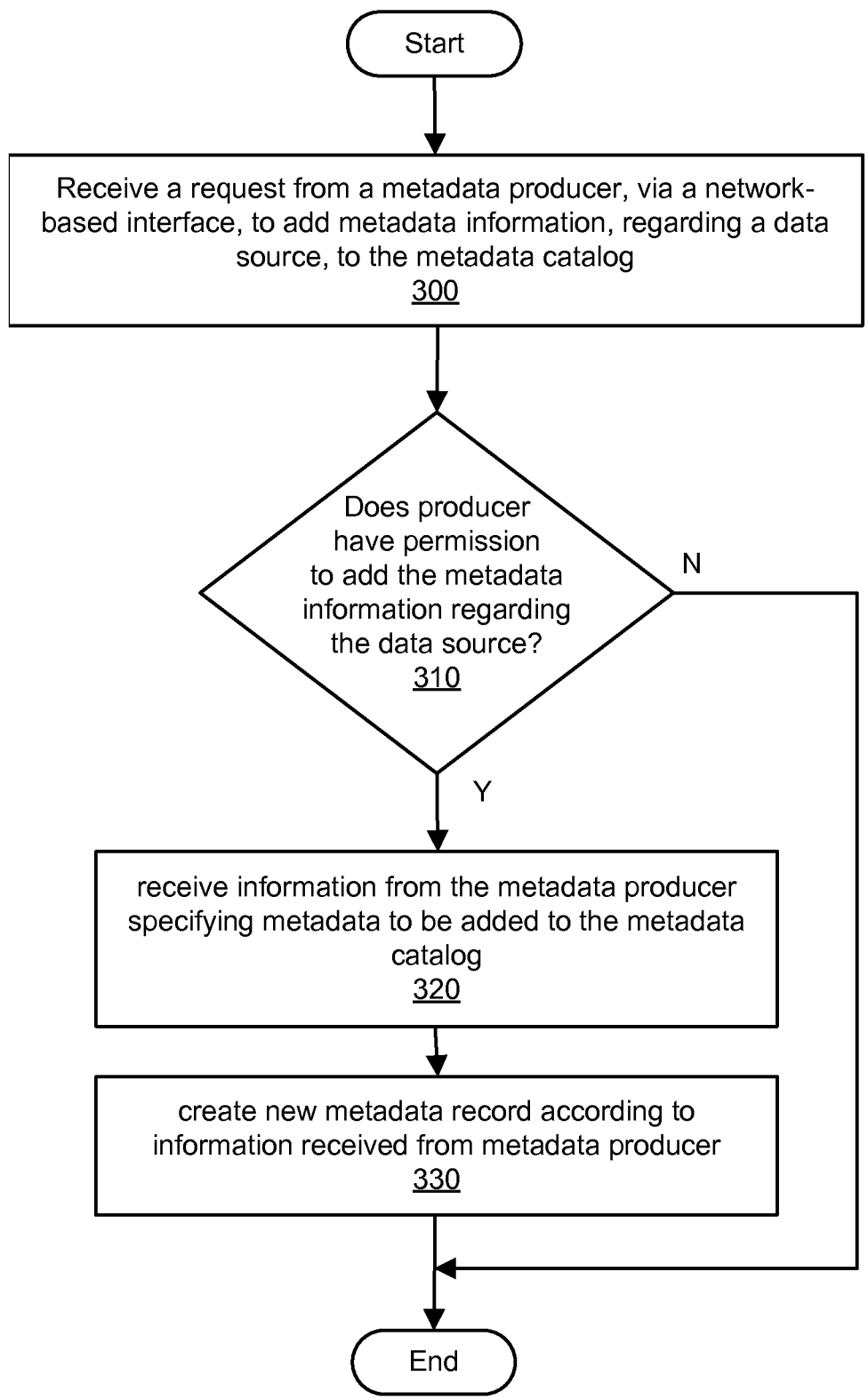
FIG. 3 is a flowchart illustrating one embodiment of a method for creating or adding metadata in a metadata catalog via a metadata catalog service.

Metadata catalog service 120 may provide the ability to create or add metadata to metadata catalog 110. FIG. 3 is a flowchart illustrating one embodiment of a method for creating or adding metadata in a metadata catalog via a metadata catalog service. As shown in block 300, a metadata catalog service, such as metadata catalog service 120, may receive a request from a metadata producer, such as metadata producer 150, to add metadata information regarding a particular data source, such as data source 130, to a metadata catalog, such as metadata catalog 110. As described, a metadata user application, such as metadata producer 150 may communicate with metadata catalog service 120 in any of various manners, such as via a web page, an SDK, a JDBC interface, a command line interface, user interface console, an API and/or via network-based interface (any of which may be secure in nature).

As noted above, metadata catalog service 120 may be configured to implement access roles and/or permissions (referred to herein collectively as access permissions), according to some embodiments. Thus, metadata catalog service 120 may receive and evaluate role, identity and/or permission information (e.g., such as access keys) to determine whether or not the particular metadata producer has permission to add metadata to the metadata catalog. Metadata catalog service 120 may be configured to implement access permission on any of various levels. For example, metadata catalog 120 may implement access permissions, such that a particular metadata producer or consumer may have access to some, all or none of the metadata maintained by metadata catalog service 120. Similarly, a particular metadata producer or consumer may have particular access to metadata, according to some embodiments. For example, a particular metadata consumer may have permission to retrieve (e.g., read, obtain and/or download) metadata, but may not have permission to modify or add metadata. In some embodiments, a metadata producer may have permission to add and retrieve metadata, but may not have permission to modify metadata already in the metadata catalog.

Additionally, a metadata producer or consumer may have access to some metadata but not to other metadata, according to various embodiments. Thus, users of a metadata catalog service may be able to add metadata to the metadata catalog and define who can add, access and/or modify the metadata added by that user. For example, a university may make certain data sources freely available to the public and may therefore add metadata to a metadata catalog without defining any access restrictions to the metadata, thereby allowing any metadata consumer to obtain metadata from the metadata catalog in order to access the published data.

In another embodiment however, a company may publish data to only a few users (e.g., employees of the company) and therefore may use a metadata catalog service to maintain metadata regarding the published data but may restrict access to the metadata to only employees of the company via access permissioned implemented by the metadata catalog service.

Returning now to FIG. 3, If the particular metadata producer does have permission to add the metadata information regarding the data source, as illustrated by the positive output of decision block 310, the metadata catalog service may receive information the data source from the metadata producer specifying metadata to be added to the metadata catalog, as shown in block 320. As described above, metadata catalog service 120 may be configured to allow access via any of various methods and/or mechanisms, according to different embodiments. For example, a metadata producer may utilize one or more exposed API methods to request the addition of metadata to a metadata catalog, provide permission information (e.g., authentication information), as well as provide the details of the metadata to add to the catalog.

While displayed in FIG. 3 as separate actions performed in particular order, as shown by block 300, 310 and 320, a metadata producer may perform such actions in any of various manners, according to different embodiments, and not merely in the fashion shown (for ease of explanation) in FIG. 3.

Additionally, as shown in block 330, the metadata catalog service may create a new metadata record according to the information received from the metadata producer to add the metadata information to the metadata catalog. As noted above, the metadata maintained by metadata catalog service 120 in metadata catalog 110 may be encrypted, in some embodiments. In one embodiment, the metadata information provided by the metadata producer may be encrypted by the producer and stored as encrypted data by metadata catalog service 120. In other embodiments, however, the metadata information may be encrypted by metadata catalog service 120. Additionally, the specific encryption method and/or encryption key used to encrypt metadata may be specified by metadata catalog service 120 and/or the metadata producer, according to various embodiments.

Figure 4:
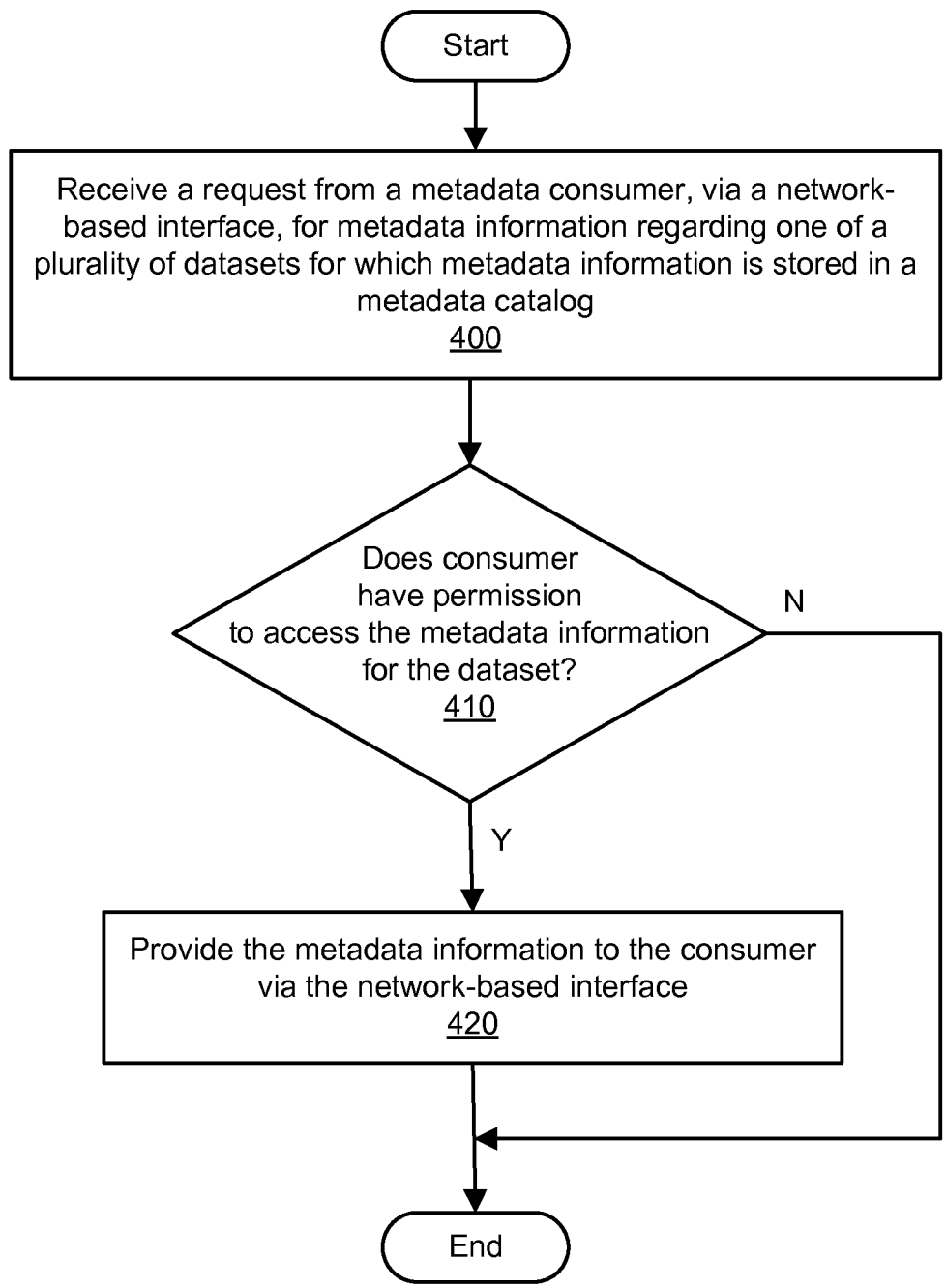
FIG. 4 is a flowchart illustrating one embodiment of a method for accessing metadata via metadata catalog service, as described herein.

FIG. 4 is a flowchart illustrating one embodiment of a method for implementing a metadata catalog service, as described herein. As illustrated in block 400, a metadata catalog service, such as metadata catalog service 120, may receive a request from a metadata consumer, such as metadata consumer 140, via a network-based interface, for metadata information regarding one of a plurality of data sources, such as data source 130, for which metadata information is stored in a metadata catalog, such as metadata catalog 110. For example, data consumer 140 may desire to access data stored in data source 130 may communicate over network 100 to request metadata from metadata catalog 110 via metadata catalog service 120.

In some embodiments, metadata catalog service 120 may determine whether the requesting metadata consumer has permission to access the metadata information for the data source, as illustrated in block 410. For instance, metadata catalog service 120 may consult any of various identity or permission information, either stored in metadata catalog 110 or via an external identity/permissions database, to determine whether the consumer as permission to access the requested metadata. For example, in one embodiment, metadata catalog service 120 may be configured to access one or more resource-based policies regarding access permissions. Utilizing resource based policies may allow metadata catalog service 120 to provide cross-account access to metadata and/or data.

If metadata catalog service 120 determines that the consumer does not have permission, as indicated by the negative output of block 410, metadata catalog service 120 may not provide the metadata to the requesting consumer. If, however, metadata catalog service 120 determines that the consumer does have permission, as indicated by the positive output of block 410, metadata catalog service 120 may provide the metadata information to the consumer, such as via the network-based interface, as shown in block 420. For example, metadata catalog service 120 may provide metadata from metadata catalog 110 to data consumer application 140 across network 100.

Additionally, the consumer may then be able to programmatically access the data source according to the received metadata information. For instance, metadata catalog service 120 may provide particular schema information describing the structure and/or format of data stored in the data source and the consumer may utilize the metadata information to properly access the data.

While FIG. 4 describes the use of network-based interfaces for communication between a requesting metadata consumer and metadata catalog service 120, in some embodiments, other forms of communicating with metadata catalog service 120 may be used.

As noted above, any interface used to interact with metadata catalog service 120 may be secure and the metadata itself may also be encrypted, according to various embodiments. Thus, in some embodiments, the metadata consumer may have to provide authentication information (e.g., via a secure interface) and/or decrypt the metadata in order to access the data source using the information in the metadata. In another embodiment, metadata catalog service 120 may be configured to decrypt the metadata information prior to communicating it to the metadata consumer, possibly using a decryption key provided by the metadata consumer. The particular encryption method and/or decryption key used may be specified by metadata catalog service 120 and/or the metadata consumer, according to various embodiments.

Figure 5:
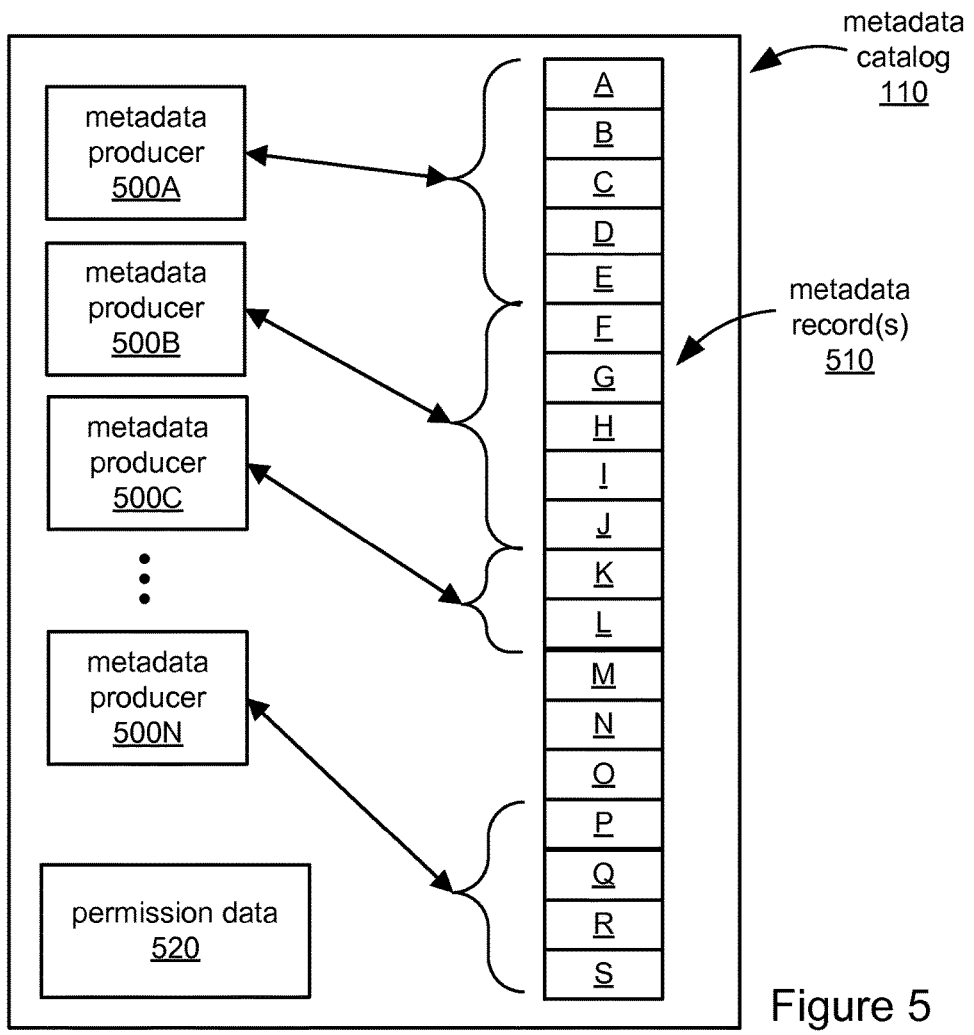
FIG. 5 is a logical block diagram illustrating, according to one embodiment, a metadata catalog including multiple metadata records for multiple metadata consumers.

FIG. 5 is a logical block diagram illustrating, according to one embodiment, a metadata catalog including multiple metadata records for multiple metadata consumers. As illustrated in FIG. 5, metadata catalog 110 may, according to some embodiment, include multiple metadata records 510 added (e.g., managed or owned by) various metadata producers 500A through 500N. As described above, various forms of access permissions may be applied to a particular metadata consumer's (or producer's) ability to access metadata within metadata catalog 110. In some embodiments, the producer adding the metadata to the metadata catalog may define and/or configure the access permissions for the metadata added by that producer. Thus, as shown in FIG. 5, metadata producer 500A may have added the metadata stored within metadata records 510A-510E and therefore may be able to define and/or configure access permissions regarding access to those metadata records.

In some embodiments, the particular access permission definitions and/or configuration may be stored within metadata catalog 110, such as in permission data 520, which may represent virtually any sort of permission data. In other embodiments, however, access permission information, such as permission data 520, may be stored external to metadata catalog 110. In yet other embodiments, access permission information may be stored within metadata records themselves, as will be described in more detail below regarding FIG. 6. Please note that while metadata records 510 are shown as being grouped by metadata producer, such grouping may represent a logical grouping only and may not represent any particular physical arrangement or structure.

Similarly, metadata producers 500B, 500C and 500N may have added the metadata stored in metadata records 510F-510J, 510K-510L and 510P-510S, respectively, and may therefore define and or configure the access permissions regarding their respective metadata.

Figure 6:
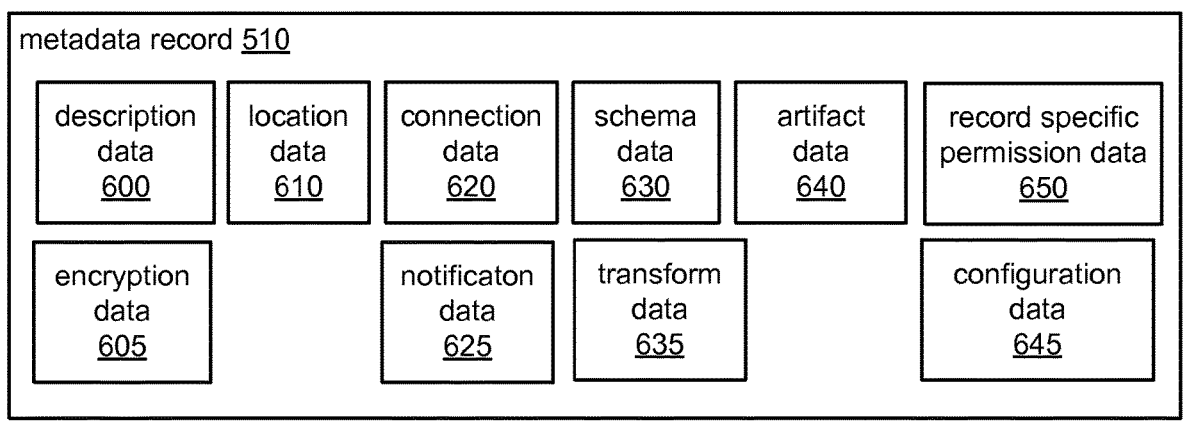
FIG. 6 is logical block diagram illustrating one example of a metadata record within a metadata catalog, according to one embodiment.

As noted above, metadata catalog 110 may store various types of metadata regarding various data sources. FIG. 6 is logical block diagram illustrating one example of a metadata record within a metadata catalog, according to one embodiment. For instance, metadata catalog 110 may include multiple metadata records 300. For ease of description, FIG. 6 illustrates a simple flat record structure for storing metadata. However, metadata catalog 110 may store metadata in any of various structures and database formats.

As shown in FIG. 6, a metadata record 510 may include various types of metadata information, such as description data 600, location data 610, connection data 620, schema data 630, artifact data 640, encryption data 605, notification data 625, transform data 635, configuration information 645, and/or record specific permission data 650, according to one embodiment. Metadata catalog 110 may store some, none, or all of these particular types of metadata information for different data sources, according to various embodiments. Thus, metadata catalog 110 may store location data 610 and schema data 630 for some data sources, while storing description data 600, schema data 630 and location data 610 for other data sources as the same time.

The exact nature, definition and/or structure of description data 600, location data 610, connection data 620, schema data 630, artifact data 640, encryption data 605, notification data 625, transform data 635, configuration information 645, and/or record specific permission data 650 may vary from embodiment to embodiment. For instance, in one embodiment, description data 600 may include a textual description, such as a title, of the data source which the particular metadata record describes. Location information 610 may include information, such URL information, allowing the data source to be located, such as within (or across) network 100. Similarly, connection data 620 may include information specifying one or more communication protocols for communicating with the data source at a location specified by location data 610.

Schema data 630 may include information describing the definition and/or structure of data stored on the data source corresponding to the particular metadata record. For example, schema data 630 may, in one embodiment, represent an XML description of data stored on the data source. In general, schema data 630 may represent any suitable description of partitions, tables and/or records on a particular data source. Thus, metadata catalog service 120 may provide a standard (e.g., uniform) view of metadata for a data source, and schema data 630 may, in some embodiments, be considered the standard definition for data within the corresponding data source.

In some embodiments, encryption data 605 may represent information regarding one or more pieces of encrypted metadata, while in other embodiments, encryption data 605 may represent information regarding encrypted data on a data source. In yet other embodiments, encryption data 605 may represent information regarding using a secure interface to access data or a data source (e.g., such as when the data is not stored encrypted, but may be encrypted when communicated). For instance, encryption data 605 may represent, in some embodiments, information indicating one or more particular encryption schemes or methods used to encrypt/decrypt data and/or one or more encryption keys used to encrypt or decrypt data, among other information.

Notification data 625 may represent information regarding how and who to notify regarding changes to particular data, changes to a data source, and/or changes to metadata regarding data or a data source, according to various embodiments. For example, in one embodiment, notification data 605 may represent information specifying one or more email address to be used when making notifications regarding changes to data, a data source and/or metadata. In another embodiment, notification data 625 may include information specifying the type or types of changes for which to make notifications. For instance, notification 625 may include information specifying that notifications should be made when new data is added to a particular data source. In another embodiment, however, notification 625 may include information specifying that notifications should only be made if the structure and/or format of data on a data source changes (e.g., so that data consumers may update how that data is access, parsed, used, etc.).

Configuration data 645 may represent any of various types of configuration information, according to different embodiments. For instance, in one embodiment, configuration data 645 may represent configuration or settings information regarding connecting to, or accessing, a particular data source. In another embodiment, configuration information may represent configuration or settings information regarding how to configure a separate application that may be used with particular data from a data source. For example, configuration data 645 may specify particular settings for accessing, visualizing, displaying, analyzing, and/or manipulating data in an application. In yet other embodiments, configuration data 645 may represent information specifying how to add data to a data source.

Similarly, transform data 635 may represent any of various types of information regarding manipulation and/or transformation of data, according to various embodiments. For example, in one embodiment, transform data may represent information describing, or specifying, the transformation of data from one format to another, such as from one tabular format to another, or from a tabular format to a relational format. Additionally, transform data 635 may, in one embodiment, represent information specifying how to manipulate data from a data source to match a different data format.

Each metadata record in metadata catalog 110 may represent a separate data source and metadata records may be grouped according to data sources and/or by metadata producers, according to various embodiments. Such grouping may represent a logical grouping only and may not represent any particular physical arrangement or structure.

Additionally, according to various embodiments, metadata catalog 110 may store permission data in any of various manners, such as record specific permission data 650 within an individual metadata record or as permission data 520 separately from the individual metadata records as described above. In some embodiments, metadata catalog 110 may store different types of permission data in different manners. For instance, record specific permission data 650 may represent permission data for a particular data source while permission data 520 may represent permission data for multiple data sources, such as all the data sources managed by a particular metadata producer.

The format, number and types of metadata information stored within a metadata record may vary from embodiment to embodiment. Virtually any sort of data structure suitable for storing and/or maintaining metadata information may be utilized by a metadata catalog and/or metadata catalog service, as described herein. For example, according to various embodiments, metadata information may be stored within a metadata catalog using a flat data model, a hierarchical data model, a network data model, a relational data model, an object model, among others. Additionally virtually any data structures may be utilized within a metadata catalog, including but not limited to, arrays, trees, binary trees, balanced trees, heaps, and or data graphs, according to different embodiments. Furthermore, a metadata catalog service may utilized virtually any suitable database standard when accessing a metadata catalog, including but not limited to, structured query language (SQL), open database connectivity (ODBC), and Java database connectivity (JDBC), among others.

In some embodiments, metadata catalog 110 may store fewer, different, or more types of metadata information than that illustrated in FIG. 6.

Additionally, in some embodiments, metadata catalog service 120 may be configured to store artifact information regarding binary artifacts for accessing data source for which metadata is maintained in a metadata catalog. A binary artifact, as described herein may represent any of various types of objects, modules, components, specifications, etc., usable for accessing data on a data source. For instance, a binary artifact, such as may be described by artifact data 640, may represent executable modules (e.g., serializers or deserializers), software development kits, scripts, queries, etcs., according to various embodiments. For example, a binary artifact may be a loadable software module (such as a Java class file) configured to access a particular data source, in one embodiment. In general, artifacts may be based on any of various computer languages and/or computer environments, according to different embodiments.

Below is one possible example of information describing an artifact:

```
artifact{
    path: <string: s3 location of the artifact>
    ,framework: <?enum or string? For example Hive, Pig,
        Cascading,
        Storm>
    ,format: <?enum or string? For example "json", "avro",
        "xml",
        "etc">
    ,description: <string: textual description>
    ,documentation: <string: link to sample code that demonstrates
        usage>
        ,?:?
}
```

In some embodiments, metadata catalog service 120 may include a repository for binary artifacts. For example, metadata catalog may store artifacts for accessing data from data sources for which metadata is stored within metadata catalog 100. In other embodiments, artifacts may be stored within metadata catalog along with the metadata describing the same data source that the artifact may be used to access.

Thus, a metadata record may include artifact data 640 specifying information regarding a binary artifact for accessing the data source related to the metadata stored in the metadata record. The actual artifact may be stored within artifact data 640 or separately from (e.g., externally) the metadata record 510. In some embodiments, the actual artifact may be stored within an artifact repository that is part of metadata catalog service 120, such as artifact repository 115, while in other embodiments, artifact data 640 may reference an artifact that is stored separately from the metadata catalog service altogether.

A metadata consumer may retrieve a binary artifact according artifact data 640. For instance, artifact data 640 may identify a particular binary artifact stored within artifact repository 115, in one embodiment. In another embodiment, artifact data 640 may provide with location information (e.g., a universal resource locator or URL) to an artifact maintained external to metadata catalog service 120 along with information identifying the particular binary artifact within the repository.

In some embodiments, metadata catalog service 120 may expose an API for accessing (e.g., storing, modifying and/or retrieving) artifacts from the artifact repository. As described above, metadata catalog service 120 may be configured to provide a secure (e.g., encrypted) interface and any interface regarding accessing artifacts, such as an interface for interacting with artifact repository 115, may also be secure. The following example API methods represent one possible example API for accessing artifacts via a metadata catalog service, according to one embodiment:

ListArtifacts(ArtifactFilterCollection filters);
  eg ({filter:{framework:'hive'}, filter{description:}})
GetArtifact(String artifactId);
CreateArtifact(Artifact artifact)
UpdateArtifact (Artifact artifact);
DeleteArtifact (String artifactId);

In some embodiments, the information stored in metadata record 510, such as description data 600, location data 610, connection data 620, schema data 630, artifact data 640, and/or record specific permission data 650 may be encrypted. In general, some, any or all of the metadata information in a metadata record may be encrypted using the same or different cryptographic methods and using the same or different encryption keys. Thus, metadata catalog service 120 and/or a metadata consumer may have to decrypt the information a metadata record, according to various embodiments.

Figure 7:
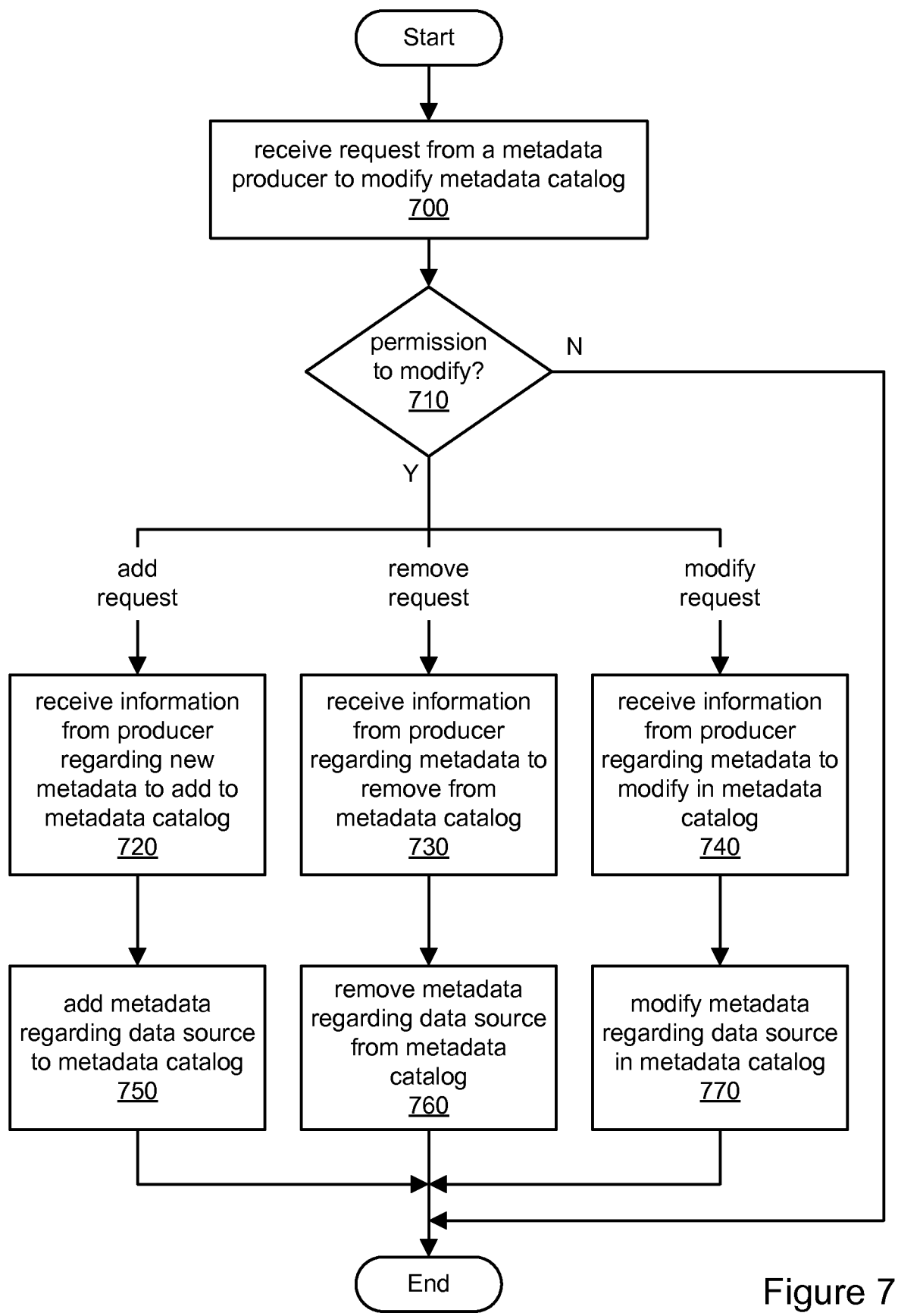
FIG. 7 is a flowchart illustrating one embodiment of a method for modifying metadata in a metadata catalog via a metadata catalog service, as described herein.

Metadata catalog service 120 may provide the ability to modifying (e.g., adding, modifying and/or removing) metadata stored on metadata catalog 110. FIG. 7 is a flowchart illustrating one method for modifying metadata stored in a metadata catalog, according to one embodiment. As shown in block 700, a metadata catalog service, such as metadata catalog service 120, may receive a request from a metadata producer, such as metadata producer 150, to modify metadata maintained in a metadata catalog, such as metadata catalog 110. As described above regarding retrieving metadata from a metadata catalog, a metadata producer may communicate with metadata catalog service 120 in any of various manners, such as via a web page, an SDK, a JDBC interface, a command line interface, user interface console, an API and/or via network-based interface.

As shown by the decision block 710, metadata catalog service 120 may be configured to determine whether or not the particular metadata producer has permission to modify the particular metadata. As explained above, metadata catalog service 120 may utilize any of various methods and/or mechanisms when determining whether to grant access to particular metadata within metadata catalog 100, according to various embodiments. For instance, metadata catalog service 120 may be configured to grant or deny access based on the particular producer, data source and/or the particular type of access (e.g., adding, accessing, removing and/or modifying) requested.

Metadata catalog service 120 may verify permissions at various points of the method illustrated in FIG. 7, according to different embodiments. For example, in one embodiment, a metadata consumer may need permission to perform any sort of modification (addition, removal or modification) to metadata for a particular data source. In other embodiments however, a data source may have different permissions regarding different types of modification. For example, some metadata consumers may have permission to add new metadata (e.g., for a new data source), but may not have permission to remove to modify metadata.

Furthermore, metadata catalog service 120 may provide (and/or expose) a permission API that allows data consumers to set and/or modify the permissions and/or roles information regarding one or more data sources and/or data sources, according to some embodiments.

If the producer does have permission to modify the metadata information, as indicated by the positive output of decision block 710, metadata catalog service 120 may my proceed to make the requested modification.

For example, if the producer requested to add metadata for a new data source, metadata catalog service 120 may receive information from the producer regarding new metadata to add to the metadata catalog, as shown by block 720 and may then add the metadata regarding the new data source to the metadata catalog, as shown in block 750. The metadata added to the catalog may be provided by the producer, either in the same request or using another mechanism. For example, according to one embodiment, the producer may utilize one API call to request to add metadata to a catalog, and may utilize one or more other API calls to specify the metadata to add. In another embodiment, the producer may utilize a metadata migration mechanism provided by metadata catalog service 120 to add metadata for new data sources to an existing metadata catalog, such as metadata catalog 110.

According to one embodiment, the metadata producer may utilize one API call to request to add metadata to a catalog, and utilize one or more other API calls to specify the metadata to add. In another embodiment, the producer may utilize a metadata migration mechanism provided by metadata catalog service 120 to add metadata for new data sources to an existing metadata catalog, such as metadata catalog 110. In some embodiments, metadata catalog service 120 may be configured to expose an API including methods for adding new metadata for a new dataset or data source to a metadata catalog. For example, when adding metadata for a new data source, a data producer may call a variety of API methods, such as a CreateDatabase method to initially request the addition of a new data source (e.g., include metadata describing the data source) to the metadata catalog. Additionally, the metadata producer may also call AddPartition and/or CreateTable methods to add particular metadata information regarding the new data source.

Similarly, if the request is to remove metadata from for a particular data source from the metadata catalog, metadata catalog service 120 may receive information regarding the metadata to remove, as indicated by block 730 and may then proceed to remove the metadata regarding the particular data source from the metadata catalog, as shown in block 760. Continuing the API examples, a producer may call DropDatabase, DropTable, and/or DropPartition API methods in order to remove metadata for a particular data source from a metadata catalog, according to some embodiments.

Similarly, if the request is to modify the metadata for a particular data source, metadata catalog service 120 may receive information from the producer regarding metadata to modify in the metadata catalog as indicated by block 740 and may then modify the metadata for the particular data source in the metadata catalog, as shown in block 770. For example, in some embodiments, a metadata producer may utilize various API methods, such as AlterDatabase, AlterTable, and/or AlterPartition to modify the metadata for a particular data source in the metadata catalog.

Additionally, metadata catalog service 120 may also support notification of changes to the metadata catalog. Thus, while not shown in FIG. 7, metadata catalog service 120 may send one or more notifications regarding the changes (e.g., addition, deletion or modification) to the metadata stored in the metadata catalog. For example, metadata catalog service 120 may be configured to utilize any (or multiple) of various notification services to notify producers/consumers that metadata has changed.

Figure 8:
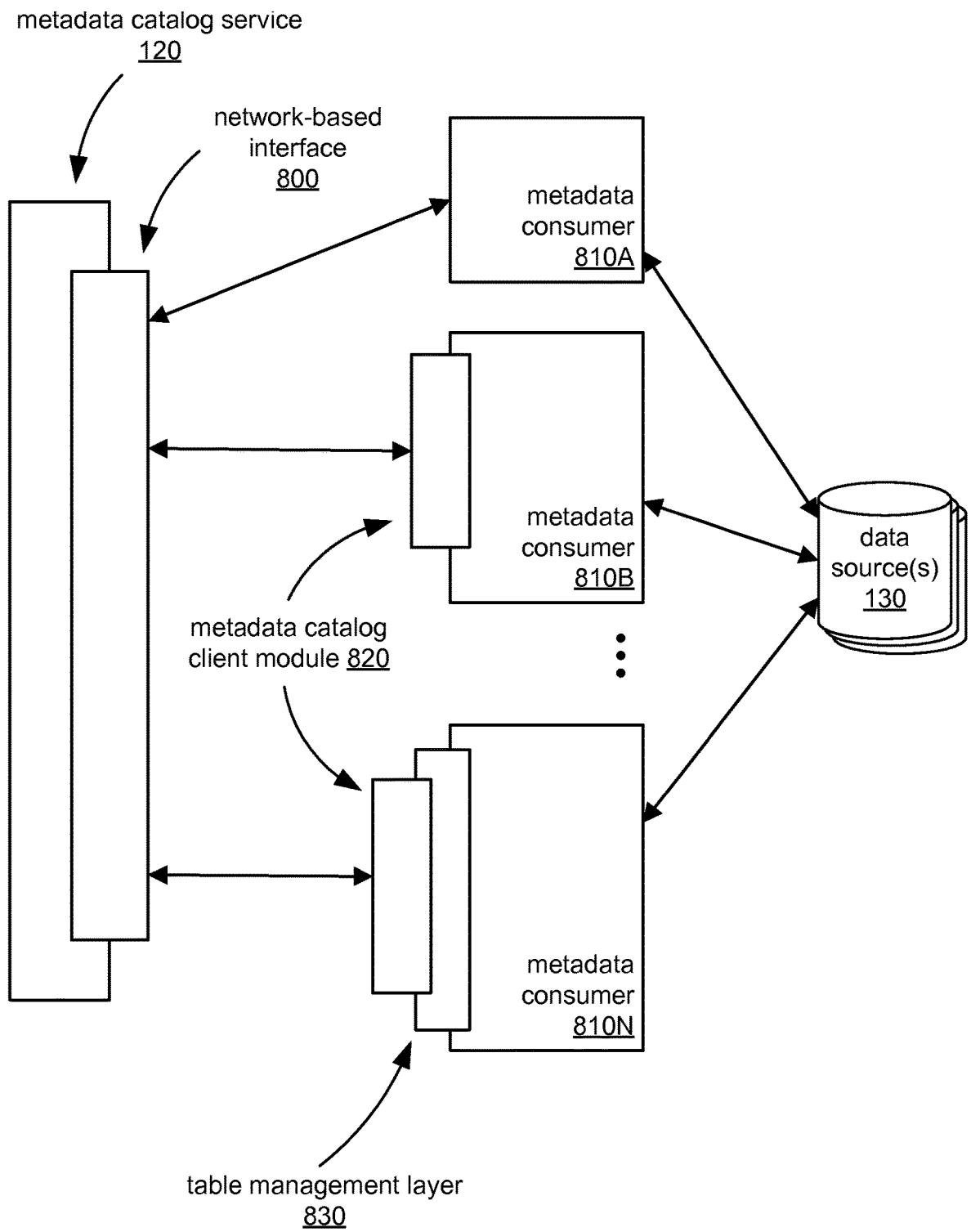
FIG. 8 is block diagram illustrating various modules involved in communicating with a metadata catalog service, as in one embodiment.

FIG. 8 is block diagram illustrating metadata consumers communicating with a metadata catalog service, as in one embodiment. As noted above, metadata catalog service 120 may be configured to provide metadata catalog services to metadata consumers, such as metadata consumers 810a through 810N via a network-based interface, such as via network-based interface 800. For example, metadata catalog service 120 may be configure to support a message-based interface, such as using simple object access protocol (SOAP) messages sent via hypertext transport protocol (HTTP), thereby allowing data consumers to programmatically access metadata information stored in metadata catalog 110, according to one embodiment.

Thus, metadata catalog service 120 may support, utilize, and/or be integrated with, network-based interface 800, which may be configured to communicate with metadata catalog client module 820. In some embodiments, metadata consumers may be configured to interact with metadata catalog service 120 via network-based interface 800 by utilizing metadata catalog client module 820. In other embodiments, however, data metadata consumers may not utilize a metadata catalog client module. Thus, as illustrated in FIG. 8, metadata consumer 810A may interact directly with network-based interface 800, while metadata consumers 810B through 810N may interact with network-based interface 800 via metadata catalog client module 820.

In some embodiments, metadata catalog client module 820 may be configured to provide access to metadata catalog service 120 by a table management layer 830. A table management layer may be a software module that enables different data processing tools (e.g., applications) to read and write data via a table abstraction that presents a relational view of data. Thus, when using a table management layer, the individual data applications, such as metadata consumers 810A through 810N, may not need any information regarding the location or format of the data source since the table management layer 830 may provide that information, according to metadata information obtained from metadata catalog service 120.

Thus, metadata consumers may then access data from various data sources using metadata information obtained from a metadata catalog service, as described herein.

Figure 9:
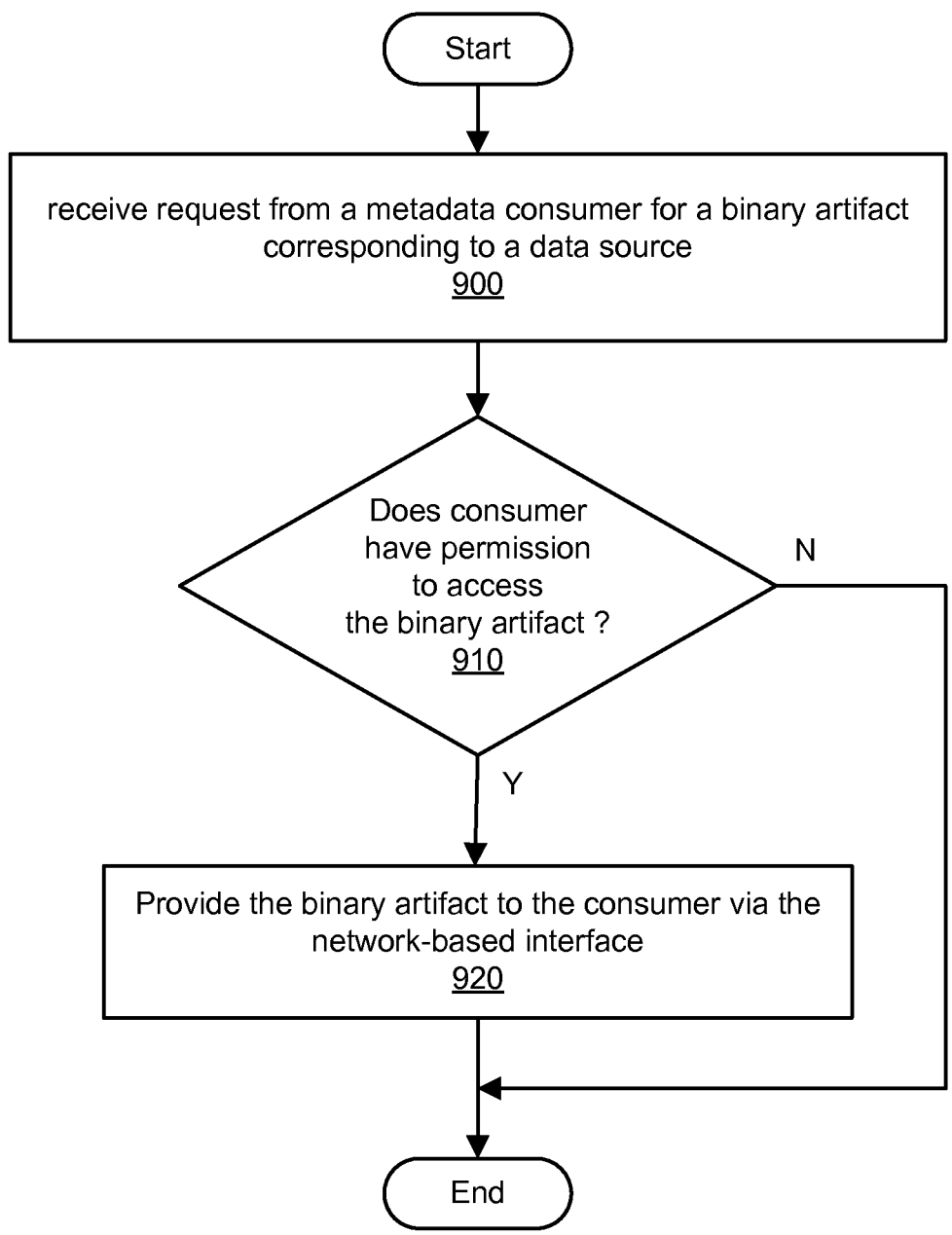
FIG. 9 is a flowchart illustrating one embodiment of a method for accessing an artifact repository via a metadata catalog service, as described herein.

FIG. 9 is a flowchart illustrating one embodiment of a method for retrieving a binary artifact from a metadata catalog service. According to some embodiments, a metadata consumer may request a binary artifact suitable for accessing one of a plurality of data sources for which metadata information is stored in a metadata catalog. Thus, metadata catalog service 120 may receive request from a metadata consumer for a binary artifact corresponding to a particular data source, as shown in block 900. For instance, in one embodiment, the metadata consumer may call one or more API method, such as a GetArtifact method, exposed by metadata catalog serviced 120 to request a binary artifact.

As described above, metadata catalog service 120 may be configured to determine whether or not the particular metadata consumer has permission to access (e.g., retrieve or download) the particular binary artifact, as shown by decision block 910. If metadata catalog service 120 determines that the metadata producer does have permission to access the particular binary artifact, as indicated by the positive output of bock 910, Metadata catalog serviced 120 may provide the binary artifact to the consumer via the network-based interface, as shown in block 920.

Figure 10:
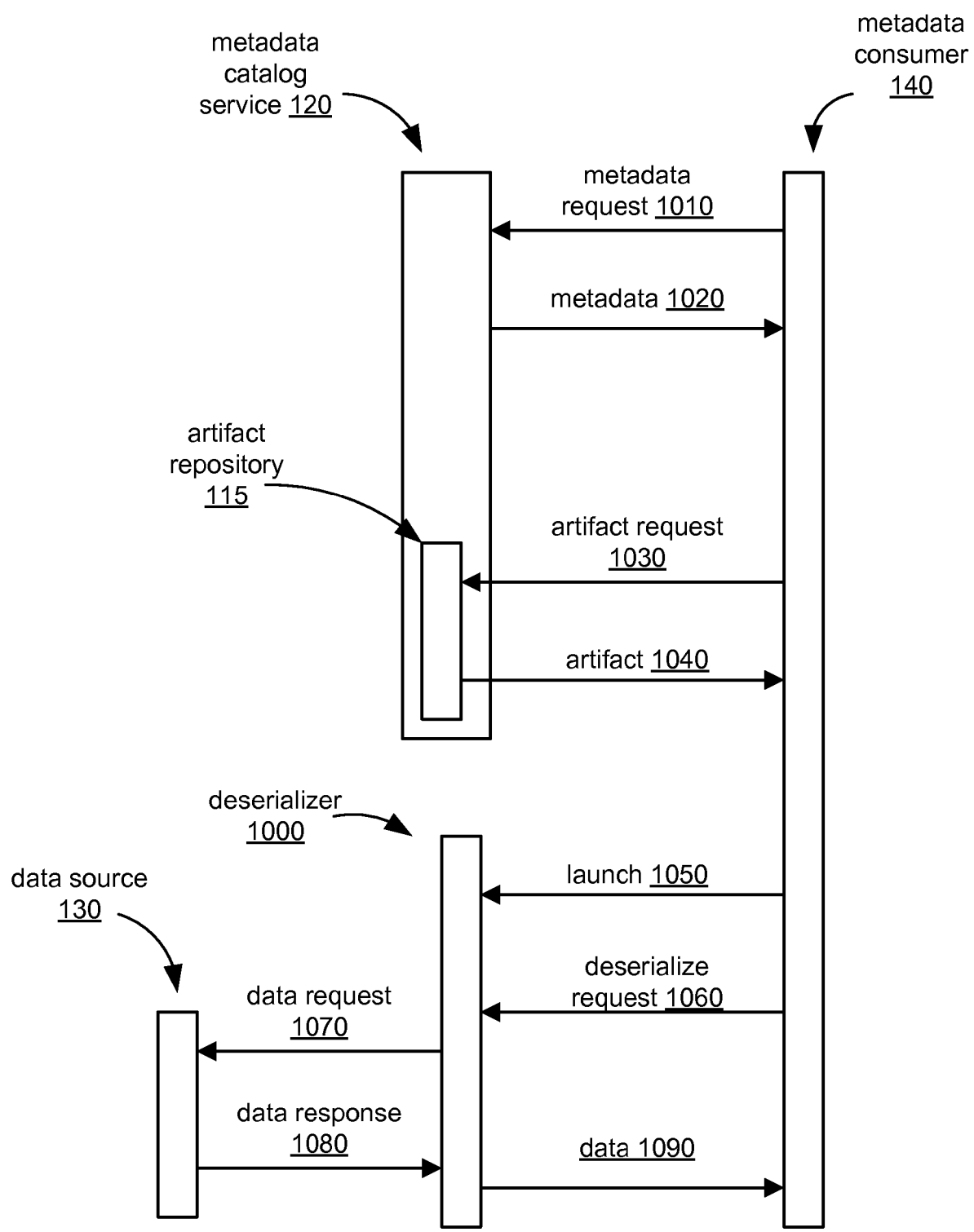
FIG. 10 is a logical block diagram illustrating an example communication flow involved with accessing data using metadata from a metadata catalog, according to one embodiment.

FIG. 10 is a logical diagram illustrating interactions (e.g., communications) between metadata consumers and various other entities when utilizing a metadata catalog service, according to one embodiment. Thus, metadata consumer 140 may access metadata catalog service 120 to obtain metadata information regarding data in data source 130, as shown by arrows 1010 and 1020. The metadata received by metadata consumer 140 may include information regarding a binary artifact, such as deserializer 1000, stored on binary artifact repository 115, according to some embodiments. Metadata consumer 140 may then access binary artifact repository 115 utilizing information from metadata catalog service 120, as shown by arrows 1030 and 1040. For example, metadata catalog service 120 may have provided artifact data 640 (described above) that may identify a binary artifact including deserializer 1000 within binary artifact repository 115. Additionally the metadata information from metadata catalog service 120 may include information indicating how to access (e.g., retrieve) deserializer 1000 from binary artifact repository 115.

In some embodiments, metadata catalog service 120 may provide information regarding multiple binary artifacts for a particular dataset and/or data source, allowing the data consumer to choose a particular type of binary artifact with which to access the data. For example, metadata catalog service 120 my provide information regarding both a serializer and a deserializer for a data source, according to some embodiments.

After retrieving deserializer 1000 from binary artifact repository 115, metadata consumer 140 may load or launch deserializer 1000, as shown by arrow 1050 and access data source 130 via deserializer 1000, as shown by arrows 1060, 1070, 1080 and 1090. The exact nature of using deserializer to access data from data source 130 may vary from embodiment to embodiment and may depend upon the exact natures of both the deserializer and the data source. For example, in one embodiment, metadata consumer 140 may call a one or more methods of deserializer 1000, as represented by arrow 1060, and deserializer 1000 may then access data source 130, such as via one or more database access methods, as represented by arrow 1070. The data may then be returned to deserializer 1000 and in turn to metadata consumer 140, such as by parameters to a method of deserializer 1000 for example, as represented by arrows 1080 and 1090, respectively, according to one embodiment.

Illustrative Computer System

Figure 11:
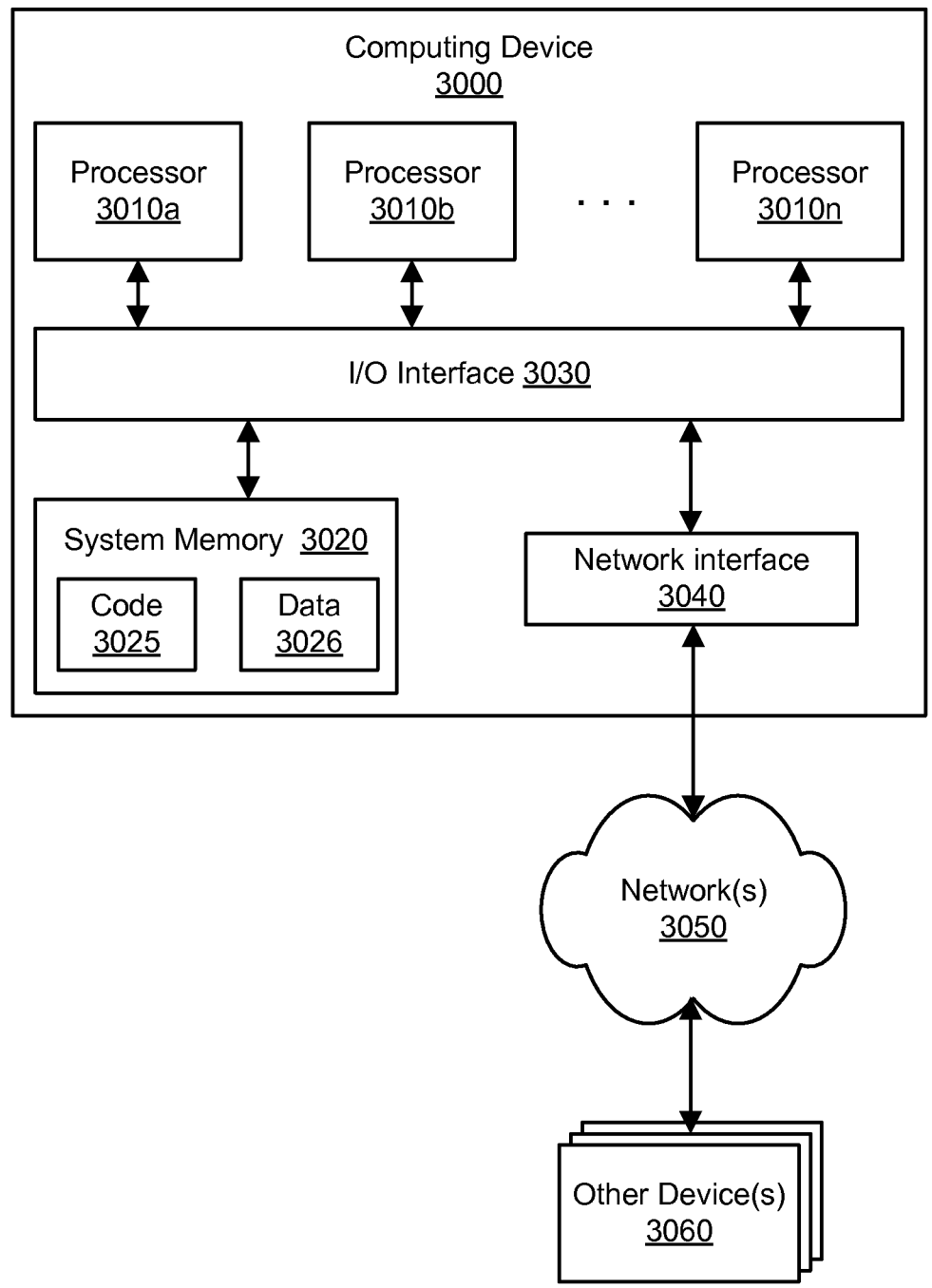
FIG. 11 illustrates an example computer system suitable for implementing a metadata catalog service, according to one embodiment.

In at least some embodiments, a computer system that implements a portion or all of one or more of the technologies described herein may include a general-purpose computer system that includes or is configured to access one or more computer-readable media. FIG. 11 illustrates such a general-purpose computing device 3000. In the illustrated embodiment, computing device 3000 includes one or more processors 3010*a*-3010*n* coupled to a system memory 3020 via an input/output (I/O) interface 3030. Computing device 3000 further includes a network interface 3040 coupled to I/O interface 3030.

A computing device 3000 (such as implementing metadata catalog 110 and/or metadata catalog service 120) may be any of various types of devices, including, but not limited to, a programmable logic controller, programmable logic array, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

A computing device 3000 may include a processor unit 3010 (possibly including multiple processors, a single-threaded processor, a multi-threaded processor, a multi-core processor, etc.) which may be configured to execute one or more modules or applications configured to implement a metadata catalog service, such as metadata catalog service 120, which may be present within program instructions stored in system memory 3020 of the same computing device 3000 or may be present within program instructions stored within a memory of another computer system similar to or different from computing device 3000.

In various embodiments, computing device 3000 may be a uniprocessor system including one processor or a multiprocessor system including several processors 3010*a* and 3010*b* through 3010*n* (e.g., two, four, eight, or another suitable number), referred to collectively as processors 3010. Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026. For example code 3025 may represent program instruction configured to implement metadata catalog service 120, in one embodiment.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computers configured to implement:
a persistent metadata store comprising metadata information regarding a plurality of data sources; and
a metadata catalog service, wherein the metadata catalog service is accessible at a plurality of entry points via an application programming interface that provides discovery of, and access to, the metadata information of the metadata store;
wherein the metadata catalog service is configured to:
maintain, in the metadata store, the metadata information regarding the plurality of data sources, wherein each data source is external to the metadata store and the metadata catalog service;
receive, from a plurality of different metadata producers distinct from the data sources via the application programming interface, requests to add metadata information regarding respective ones of the data sources;
in response to the requests to add metadata information, store, to the metadata store, a respective location, a respective data schema, artifact data indicating a respective binary artifact, and a respective access interface for accessing the respective ones of the data sources to the metadata store as the metadata information regarding the respective ones of the data sources, wherein the respective data schema comprises respective tabular definitions based at least in part on respective data formats of the respective ones of the data sources, wherein the respective binary artifact comprises an executable object for accessing data at the respective data source, wherein the respective access interface is distinct from the application programming interface of the metadata catalog service, and wherein the added metadata information is received from respective ones of the plurality of different metadata producers;
receive, at a particular entry point of the plurality of entry points via the application programming interface, requests from a plurality of different metadata consumers for metadata information regarding respective ones of the data sources; and
provide, in response to a respective request for metadata information, the respective requested metadata information from the metadata store to the respective metadata consumer, wherein the respective data source is accessible at the respective location via the respective access interface based on execution of the respective binary artifact by the metadata consumer, wherein data stored at the respective data source is readable by the metadata consumer according to the respective data schema indicated by the respective requested metadata information, and wherein metadata information regarding different ones of the data sources is provided to different metadata consumers based on the respective metadata consumer's request.

2. The system of claim 1, wherein the persistent metadata store and the metadata catalog service are part of a provider network configured to host a plurality of computer servers implementing a plurality of network-based services, and wherein the metadata catalog service is configured to:
   provide access to the metadata store to the plurality of different metadata producers, wherein individual ones of the plurality of different metadata producers are part of the provider network, and wherein other ones of the plurality of different metadata producers are not part of the provider network;
   provide access to the metadata store to the plurality of different metadata consumers, wherein individual ones of the plurality of different metadata consumers are part of the provider network, and wherein other ones of the plurality of different metadata consumers are not part of the provider network; and
   wherein individual ones of the plurality of data sources are part of the provider network, and wherein other ones of the plurality of data sources are not part of the provider network.

3. The system of claim 1, wherein to provide the requested respective metadata information, the metadata catalog service is further configured to determine that the respective metadata consumer has permission to access the respective metadata information based on permission data regarding the respective data source.

4. The system of claim 1, wherein the requests to add metadata information comprise authentication information for the plurality of metadata producers, and wherein to store the metadata information, the metadata catalog service is further configured to determine that the respective metadata producer has permission to add the respective metadata information to the metadata store based on permission data regarding the respective data source.

5. The system of claim 1, further comprising:
   an artifact repository comprising a plurality of binary artifacts comprising executable objects configured to provide programmatic access to data on respective ones of the plurality of data sources;
   wherein the metadata catalog service is further configured to:
      receive, via the application programming interface, requests from individual ones of the plurality of different metadata consumers for individual ones of the plurality of binary artifacts; and
      provide, in response to a respective request for a binary artifact, the respective one of the plurality of binary artifacts from the artifact repository to the respective metadata consumer, wherein different binary artifacts are provided to different metadata consumers based on the respective metadata consumer's request.

6. A method, comprising:
performing, by one or more computers comprising respective processors and memories:
   providing network-based access, via a plurality of network-based interfaces of a metadata catalog service, to metadata information regarding data on a plurality of data sources that are distinct from, and external to, the metadata catalog service, and wherein the metadata information is accessible, via the network-based interface, to a plurality of different metadata consumers that are distinct from, and external to, the metadata catalog service;
   receive, from a plurality of different metadata producers distinct from the data sources, requests to add metadata information regarding respective ones of the data sources;
   in response to the requests to add metadata information, storing, to the metadata store, a respective location, a respective data schema, artifact data indicating a respective binary artifact, and a respective access interface for accessing the respective ones of the data sources to the metadata store as the metadata information regarding the respective ones of the data sources, wherein the respective data schema comprises respective tabular definitions based at least in part on respective data formats of the respective ones of the data sources, wherein the respective binary artifact comprises an executable object for accessing data at the respective data source, and wherein the added metadata information is received from respective ones of the plurality of different metadata producers;
   receiving, from a requesting one of the plurality of metadata consumers via a network-based interface of the plurality of network-based interfaces of the metadata catalog service, a request for metadata information regarding data on a particular one of the plurality of data sources; and
   providing, in response to the request for the metadata information, the metadata information regarding data on the particular data source to the requesting metadata consumer, wherein at the particular data source is accessible at the respective location via the respective access interface based on execution of the respective binary artifact by the metadata consumer, wherein data stored at the respective data source is readable by the metadata consumer according to the respective data schema indicated by the metadata information, and wherein metadata information regarding different ones of the data sources is provided to different metadata consumers based on the respective metadata consumer's request.

7. The method of claim 6, further comprising:
determining, according to permission data for the particular data source, that the requesting metadata consumer has permission to access the metadata information regarding data on a particular one of the plurality of data sources, wherein the permission data is defined for the particular data source by a metadata producer distinct from the particular data source;
receiving, from another metadata consumer via the network-based interface of the metadata catalog service, a request for the metadata information regarding data on the particular data source;
determining, according to the permission data for the particular one of the plurality of data sources, that the other metadata consumer does not have permission to access the metadata information regarding data on the particular data source; and
not providing the metadata information regarding data on the particular data source to the other metadata consumer in response to determining that the other metadata consumer does not have permission to access the metadata information regarding data on the particular data source.

8. The method of claim 6, wherein said determining comprises validating authentication information received from the requesting consumer.

9. The method of claim 6, wherein the metadata catalog service module is configured to provide metadata information to individual ones of the plurality of metadata consumers, such that at least one metadata consumer is not provided metadata information that is provided to another of the metadata consumers.

10. The method of claim 6,
wherein said receiving a request for metadata information is performed via one or more of:
an application programming interface of the network-based interface;
a command line interface of the network-based interface; or
a web interface of the network-based interface;
wherein the request is initiated by either a human or a computer agent.

11. The method of claim 6,
wherein the metadata information regarding data on the particular data source comprises one or more of:
description data regarding the data;
location data regarding the particular data source;
connection data regarding the particular data source; or
transformation information regarding manipulating the data.

12. The method of claim 6, wherein said providing comprises decrypting the requested metadata information based, in part, on a decryption key provided by the requesting metadata consumer.

13. A non-transitory, computer-accessible storage medium comprising program instructions executable on one or more computers to implement:
providing network-based access, via a plurality of network-based interfaces of a metadata catalog service, to metadata information regarding a plurality of different data sources distinct from, and external to, the metadata catalog service, wherein the metadata information comprises information about data on the plurality of data sources, and wherein the metadata information is accessible, via the network-based interface, to a plurality of metadata producers distinct from, and external to, the metadata catalog service;
receiving, from one of the plurality of metadata producers distinct from the plurality of data sources via a network-based interface of the plurality of network-based interfaces of the metadata catalog service, a request to store metadata information regarding access to the data on one of the data sources, wherein the metadata information indicates a respective location, a respective data schema, artifact data indicating a respective binary artifact, and a respective access interface that provide access to the data on the one of the data sources, wherein the respective data schema comprises respective tabular definitions based at least in part on a respective data format of the data, wherein the data is readable according to the respective data schema, wherein the respective binary artifact comprises an executable object for accessing data at the one of the data sources;
in response to the request to store metadata information, storing, in a persistent metadata catalog configured to persistently store metadata information, the metadata information regarding the data on the one of the data sources, wherein the metadata information is received from the one of the plurality of different metadata producers;
receive, from a requesting one of a plurality of metadata consumers via another network-based interface of the plurality of network-based interfaces of the metadata catalog service, a request for metadata information regarding data on a particular one of the plurality of data sources; and
provide, in response to determining that the metadata consumer does have permission to access the metadata information, the metadata information regarding data on the particular data source to the requesting metadata consumer, wherein at the particular data source is accessible at the respective location via the respective access interface based on execution of the respective binary artifact by the metadata consumer, wherein data stored at the respective data source is readable by the metadata consumer according to the respective data schema indicated by the metadata information, and wherein metadata information regarding different ones of the data sources is provided to different metadata consumers based on the respective metadata consumer's request.

14. The non-transitory, computer-accessible storage medium of claim 13, wherein the request to store metadata information comprises schema information regarding the data on the data source.

15. The non-transitory, computer-accessible storage medium of claim 13, wherein the program instructions are further executable on the one or more computers to implement:
receiving a request from another of the plurality of metadata producers to remove metadata information for the particular one of the plurality of data sources; and
removing the metadata information regarding the particular data source from the metadata store in response to receiving the request to remove the metadata information.

16. The non-transitory, computer-accessible storage medium of claim 13, wherein the program instructions are further executable on the one or more computers to implement:
receiving a request from another of the plurality of metadata producers to modify metadata information for the particular one of the plurality of data sources; and
modifying the metadata information for the particular data source according to modification information provided in the request to modify the metadata information in response to receiving the request to modify the metadata information.

17. The non-transitory, computer-accessible storage medium of claim 16, wherein the modification information provided in the request to modify specifies one or more of:
schema information for the particular data source;
location information for the particular data source;
connection information for the particular data source;
description information for the particular data source;
an encryption key regarding either the particular data source or the metadata information for the particular data source;
notification pool information regarding the particular data source;
configuration information regarding accessing the particular data source; or
configuration information for an application regarding the particular data source.

18. The non-transitory, computer-accessible storage medium of claim 16, wherein the request to store metadata information is received according to an application programming interface call, and wherein the request to modify metadata information is received according to one or more other application programming interface calls.

19. The non-transitory, computer-accessible storage medium of claim 13, wherein the respective binary artifact comprises one or more of:
- a client software development kit configured to access data from the data source;
- scripts configured to access data from the data source;
- information specifying one or more keys values configured for accessing particular data on the data source;
- information specifying one or more queries for accessing particular data on the data source;
- a deserializer object configured to load data from the data source;
- a serializer object configured to store data to the data source; or
- a binary module executable to access the data source.

20. The non-transitory, computer-accessible storage medium of claim 13, wherein the request to store metadata information comprises a request to encrypt the metadata information, wherein the program instructions are further executable on the one or more computers to implement:
- encrypting the metadata information prior to said storing the metadata information in the persistent metadata catalog.

\* \* \* \* \*